US009722529B2

(12) United States Patent
Paintz

(10) Patent No.: US 9,722,529 B2
(45) Date of Patent: Aug. 1, 2017

(54) CONTROL FOR PULSE WIDTH MODULATED DRIVEN MOTORS

(71) Applicant: Melexis Technologies NV, Tessenderlo (BE)

(72) Inventor: Christian Paintz, Erfurt (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 3 days.

(21) Appl. No.: 14/922,329

(22) Filed: Oct. 26, 2015

(65) Prior Publication Data
US 2016/0118917 A1    Apr. 28, 2016

(30) Foreign Application Priority Data

Oct. 27, 2014   (GB) .................................. 1419098.7

(51) Int. Cl.
| | |
|---|---|
| H02P 27/08 | (2006.01) |
| H02P 6/08 | (2016.01) |
| H02P 6/182 | (2016.01) |
| H02P 6/14 | (2016.01) |

(52) U.S. Cl.
CPC .............. *H02P 27/08* (2013.01); *H02P 6/085* (2013.01); *H02P 6/142* (2013.01); *H02P 6/182* (2013.01); *H02P 2209/13* (2013.01)

(58) Field of Classification Search
CPC ................................. H02P 27/08; H02P 6/085
USPC ............................... 318/400.14, 400.01, 700
See application file for complete search history.

(56) References Cited

U.S. PATENT DOCUMENTS

| | | | | |
|---|---|---|---|---|
| 6,043,995 | A | 3/2000 | Leuthen | |
| 6,175,272 | B1* | 1/2001 | Takita | H03F 1/0244 |
| | | | | 330/10 |
| 8,310,184 | B2* | 11/2012 | Takeuchi | H02P 6/16 |
| | | | | 318/400.04 |
| 2002/0171386 | A1* | 11/2002 | Kelly | G05B 11/28 |
| | | | | 318/599 |

(Continued)

FOREIGN PATENT DOCUMENTS

| | | |
|---|---|---|
| GB | 2515086 A | 12/2014 |
| JP | 2012175866 A * | 9/2012 |

OTHER PUBLICATIONS

Machine translation JP2012175866A.*

(Continued)

*Primary Examiner* — Kawing Chan
(74) *Attorney, Agent, or Firm* — Workman Nydegger

(57) ABSTRACT

A method for assisting in operating a PWM driven motor comprising for at least one phase of the PWM driven motor: generating a pulse width modulated phase voltage scheme according to a desired phase profile with a base scaling factor, by time multiplexing a first pulse and at least a further pulse within a pulse width modulation period of the phase the first pulse having a pulse width according to a first profile, for that rotor position, multiplied with a first scaling factor, the first profile being in phase with the desired phase profile, and the at least a further pulse having a pulse width corresponds with a further profile, for that rotor position, multiplied with a further scaling factor, the further profile being not in phase with the desired phase profile, whereby the first pulse and the at least one further pulse are positioned within the pulse width modulation period of the phase in at least partially non-overlapping way.

19 Claims, 4 Drawing Sheets

(56) References Cited

U.S. PATENT DOCUMENTS

| | | |
|---|---|---|
| 2003/0020426 A1 | 1/2003 | Narumi et al. |
| 2009/0153084 A1* | 6/2009 | Mishima .................. H02P 6/16 318/400.13 |
| 2011/0012544 A1 | 1/2011 | Schulz et al. |
| 2011/0084635 A1 | 4/2011 | Brown |

OTHER PUBLICATIONS

European Search Report from EP Application No. 15191604.6-1806, Mar. 10, 2016.
GB Search Report from corresponding GB Application No. 1419098.7, Apr. 20, 2015.

\* cited by examiner

CONTROL FOR PULSE WIDTH MODULATED DRIVEN MOTORS

FIELD OF THE INVENTION

The invention relates to the field of motors driven by pulse width modulation. More specifically it relates to the field of controlling these motors by developing specific pulse width modulation schemes.

BACKGROUND OF THE INVENTION

When driving brushless DC motors by way of pulse width modulation (PWM), the width of the voltage pulses applied to the phases of the motor is used as control parameter to control the current in the motor phases. The width of the applied voltages to the motor coils windings is thereby often applied such that the current in the motor phases has a sinusoidal or similar shape versus time.

The applied PWM signals on each of the motor phases may be out of phase to each other, for a 3 phase motor they are usually 120 degrees out of phase to each other. The used waveform profiles to generate the PWM duty cycle (the percentage of the PWM on time vs. the PWM period duration) may have different characteristics, but typically lead to sinusoidal current waveforms.

The amplitude of the motor currents determines the motor output speed and torque. The amplitude of the current is manipulated by applying a duty cycle scaling. This duty cycle is calculated by multiplying the phase related (e.g. sinusoidal) value of a waveform at a given rotor angle with a scaling factor. The motor output speed/torque follows the scaling factor.

When the scaling factor becomes too small, then the applied PWM duty cycle and the resulting current are not proportional anymore, because the time to switch on and off the current (e.g. via MOS transistor) becomes non-neglectable compared to the duty cycle itself. This leads to a distortion of the motor torque and consequently to a less efficient motor operation and audible noise.

Another problem is that the measurement of motor operating parameters like for example motor current and rotor induced voltages (the so called BEMF voltage) that should be measured ideally during the PWM on time is inaccurate, because the PWM on period is too short and ringing caused by the PWM switching process itself disturbs accurate measurements. This can lead to inefficient motor control and torque ripples.

Therefore, in view of the control difficulties at low speed/torque, there is still room for improvement in controlling motors which are driven by way of pulse width modulation.

SUMMARY OF THE INVENTION

It is an object of embodiments of the present invention to improve the operation of brushless DC motors when operating at low speed/torque.

The above objective is accomplished by a method and device according to the present invention.

The present invention relates to a method for assisting in operating a PWM driven motor, e.g. a brushless DC motor, the method comprising, during at least a certain period in time, the following steps for at least one phase of the PWM driven motor, e.g. a brushless DC motor:

generating, for a given/measured rotor position, a pulse width modulated phase voltage scheme according to a desired phase profile with a base scaling factor, by time multiplexing a first pulse and at least a further pulse within a pulse width modulation period of the phase the first pulse having a pulse width according to a first profile, for that rotor position, multiplied with a first scaling factor, the first profile being in phase with the desired phase profile, and the at least a further pulse having a pulse width corresponds with a further profile, for that rotor position, multiplied with a further scaling factor, the further profile being not in phase with the desired phase profile, whereby the first pulse and the at least one further pulse are positioned within the pulse width modulation period of the phase in at least partially non-overlapping way, and wherein a combination of the profiles multiplied with their respective scaling factors corresponds with the desired phase profile multiplied with its based scaling factor. Where reference is made to the fact that the combination of the different profiles multiplied with the scaling factors corresponds with the desired profile multiplied by its scaling factor, reference is made to the fact that mathematically this may be equal not taking into account second order effects. It is to be noticed that the resulting motor output typically may be very similar, but not exactly equal.

The first scaling factor and the at least one further scaling facto may be larger than the base scaling factor.

The combination of the profiles multiplied with their respective scaling factors may be time multiplexing the profiles multiplied with their respective scaling factors. The combination may be a linear combination.

It is an advantage of embodiments of the present invention that an improved operation of PWM driven motors, e.g. brushless DC motors at low speed with low noise can be realized. By splitting the desired phase profile into two or more profiles having a higher scaling factor than the base scaling factor, a pulse width modulated phase voltage scheme can be obtained having a pulse width that is larger than the pulse width which would be obtained if the desired phase profile would not have been decomposed.

By increasing the pulse width (compared with prior art solutions), when driving the PWM driven motors, e.g. brushless DC motors at low speed and/or at a low torque, the impact of the current switch on/switch off time on the pulse width is reduced. Therefore it is an advantage of embodiments of the present invention that the distortion of the motor torque at low speeds and/or at low torque decreased (in prior art solutions the current switch on time is not neglectable compared to the pulse width resulting in distortions). It is an advantage of embodiments of the present invention that the PWM on time (pulse width) for currents with a small amplitude is bigger than in prior art solutions. A longer PWM on time has the advantage that it opens a larger window for measuring motor operating parameters such as the motor current and rotor induced voltages which are used as feedback parameters for efficient motor control. It is an advantage of embodiments of the present invention that the PWM on cycle is long enough such that the parameter measurements are not disturbed by ringing caused by the PWM switching process.

The at least a further pulse is a second pulse, the second pulse having a pulse width corresponding with a second profile, for that rotor position, multiplied with a second scaling factor, the second profile being not in phase with the desired phase profile, and whereby a combination between the multiplication of the first phase profile and the first scaling factor and the multiplication of the second phase profile and the second scaling factor corresponds with the multiplication of the desired phase profile with the base scaling factor. The combination may be time multiplexing. Where reference is made to the fact that the combination of the different profiles multiplied with the scaling factors corresponds with the desired profile multiplied by its scaling factor, reference is made to the fact that mathematically this may be equal not taking into account second order effects. It is to be noticed that the resulting motor output typically may be very similar, but not exactly equal.

The second profile may be 180° shifted with the desired phase profile and whereby the combination is a difference.

The method may furthermore comprise, prior to said generating, determining the first profile and the at least one further profile by decomposing the desired phase profile comprising a base scaling factor, into a first profile which is multiplied with the first scaling factor and at least one further profile which is multiplied with the second scaling factor, whereby the first profile is in phase with the desired phase profile, and whereby the at least one further profile is not in phase with the desired phase profile.

The first pulse may be positioned in the beginning of the pulse width modulation period and the at least one further pulse may be positioned at the end of the pulse width modulation period. It is an advantage of embodiments of the present invention that by putting the pulses at the edges of the pulse width modulation period, long at least partially non-overlapping pulse widths can be realized. It is an advantage of embodiments of the present invention that overlap between the pulses can be minimized by putting the pulses at the edges. On the other hand it Is an advantage of embodiments of the present invention that EMC behavior can be improved by placing the pulses closer to the middle of the pulse width modulation period. It is an advantage of embodiments of the present invention that the position of the pulses can be optimized depending on the intended pulse width (duty cycle). In case of a large duty cycle the pulses are placed at the edges of the pulse width modulation period to avoid overlap. At these duty cycles the speed is slow and the currents through the coils are small giving less EMC problems. For smaller duty cycles the pulses can be positioned closer to the middle.

It is to be noticed that the transition from 0 to 1 occurs at the same instance in time for the 3 phases U, V, W. Nevertheless a shift is possible. The pulse with the largest duty cycle may start first, then the second . . . . In this way the 3 phases may be not edge aligned, but may be aligned with respect to the center of the PWM pulse. The desired phase profile may be a sinusoidal phase profile. It is an advantage of embodiments of the present invention that the current is adapted for an optimal operation of the BLDC motor (e.g. when the BLDC motor is optimally driven with a BLDC current).

The method may comprise performing said generating for each of the phases of the PWM driven motor, e.g. the brushless DC motor.

Said generating may be performed during said at least a certain period in time wherein the base scaling factor is smaller than a predetermined value. Outside said certain period in time when the base scaling factor is larger than a predetermined value, the method may comprise, for at least one phase of the PWM driven motor, e.g. the brushless DC motor generating, for a given/measured rotor position, a pulse width modulated phase voltage scheme with a pulse width equal to the current value of the desired phase profile, for that rotor position, multiplied with the base scaling factor. It is an advantage of embodiments of the present invention that the PWM driven motor, e.g. the brushless DC motor can be controlled efficiently at high speeds and/or high torque and that distortions can be avoided at low speeds and/or low torque.

The method may comprise applying said generated pulses to the at least one phase of the PWM driven motor, e.g. the brushless DC motor.

The generating the pulse width modulated voltage scheme may be performed while in one of the phases the motor phase voltage is temporarily suspended and in the other phases the motor phase voltage is on, and the method may further comprise measuring at least one motor parameter in the undriven phase for defining the rotor position. It is an advantage of embodiments of the present invention that the parameter measurements are not disturbed by ringing caused by the PWM switching process. These parameters, for example the BEMF, are used to determine the rotor position and allow better control of the PWM driven motor, e.g. brushless DC motor.

The present invention also relates to a device for assisting in driving a PWM driven motor, e.g. a brushless DC motor, the device comprising a pulse width modulated phase voltage scheme generator configured for generating, for a given/measured rotor position, a pulse width modulated phase voltage scheme according to a desired phase profile with a base scaling factor, by time multiplexing a first pulse and at least a further pulse within a pulse width modulation period of the phase the first pulse having a pulse width according to a first profile, for that rotor position, multiplied with a first scaling factor, the first profile being in phase with the desired phase profile, and the at least a further pulse having a pulse width corresponds with a further profile, for that rotor position, multiplied with a further scaling factor, the further profile being not in phase with the desired phase profile, whereby the first pulse and the at least one further pulse are positioned within the pulse width modulation period of the phase in at least partially non-overlapping way, and whereby a combination between the multiplication of the first phase profile and the first scaling factor and the multiplication of the second phase profile and the second scaling factor corresponds to the multiplication of the desired phase profile with the base scaling factor. The combination may be time multiplexing.

The at least a further pulse may be a second pulse, the second pulse having a pulse width corresponding with a second profile, for that rotor position, multiplied with a second scaling factor, the second profile being not in phase with the desired phase profile and the combination between the multiplication of the first phase profile and the first scaling factor and the multiplication of the second phase profile and the second scaling factor corresponds to the desired phase profile and the base scaling factor.

Where reference is made to the fact that the combination of the different profiles multiplied with the scaling factors corresponds with the desired profile multiplied by its scaling factor, reference is made to the fact that mathematically this may be equal not taking into account second order effects. It is to be noticed that the resulting motor output typically may be very similar, but not exactly equal.

The combination may be time multiplexing.

The second profile may be 180° shifted with the desired phase profile and the combination may be a difference.

The device furthermore may comprise a processor for, prior to said generating, determining the first profile and the at least one further profile by decomposing the desired phase profile comprising a base scaling factor, into a first profile which is multiplied with the first scaling factor and at least one further profile which is multiplied with the second scaling factor, whereby the first profile is in phase with the desired phase profile, and whereby the at least one further profile is not in phase with the desired phase profile.

The device furthermore may comprise a voltage generation unit for applying voltages according to the pulse width modulated phase voltage scheme.

The device furthermore may comprise a measurement unit for measuring at least one motor parameter in an undriven phase for defining a rotor position.

The present invention also relates to a PWM motor, e.g. a brushless DC motor comprising a device for assisting in driving as described above.

The present invention furthermore relates to a computer program product comprising a set of instructions for, when executed on a computer, performing a method for assisting in driving a PWM driven motor, e.g. a brushless DC motor as described above.

The present invention also relates to a data carrier comprising a set of instructions for, when executed on a computer, performing a method for assisting in driving a PWM driven motor, e.g. a brushless DC motor as described above or to the transmission of a computer program product as described above over a local or wide area network.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
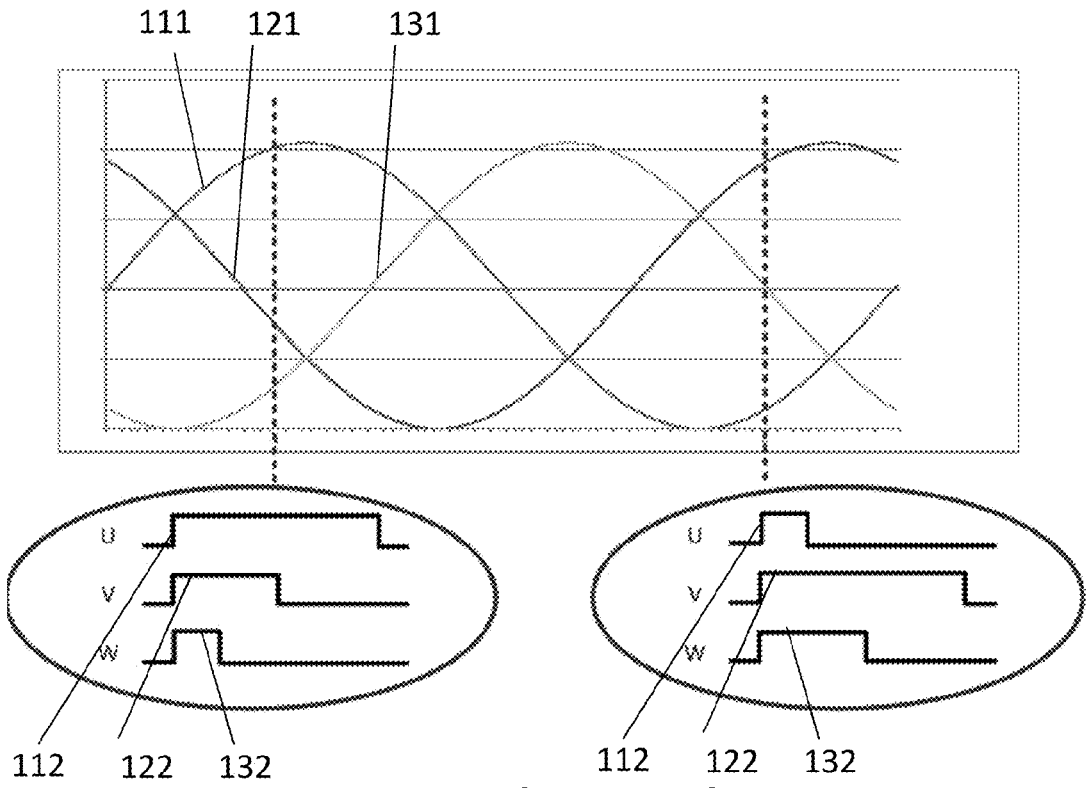
FIG. 1 illustrates a phase profile multiplied with a base scaling factor and the corresponding PWM phase voltage scheme for each of the PWM driven motor phases, e.g. the brushless DC motor phases.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments according to the present invention reference is made to "a phase profile", reference is made to a curve in function of rotor position used for obtaining the pulse width modulation scheme of a certain phase.

Where in embodiments according to the present invention reference is made to "a scale factor", reference is made to a factor which, after multiplying it with the value of the phase profile (at a given rotor angle) results in the pulse width required for obtaining the wanted current through the coil of a certain phase. During this period the pulse width modulated phase voltage is high. The amplitude of the current through the coil changes linearly with the applied scale factor. At small scale factors however, the pulse width is also influenced by the switch on/switch off time of the transistors. For these small scale factors the linearity between the scale factor and the amplitude of the current does not hold. The size of the scaling factors may depend on the motor. Typical values of the scaling factor are in the range or below 10%.

Where in embodiments of the present invention reference is made to a multiplication of a profile with a scaling factor, reference is made to multiplying the different intensity values in the profile curve (for the different rotor positions) with the scaling factor. Furthermore, where reference is made to combining the multiplications with their scaling factors, e.g. by linear combination or by difference, reference is made to combining the corresponding values for the same rotor positions.

Where in embodiments according to the present invention reference is made to the "pulse width modulation period" or "PWM period", reference is made to the period during which the pulse width modulated phase voltage may be high. At a scale factor of 1 the pulse width is equal to the width of the PWM period when the rotor angle corresponds with the maximum of the phase profile. In a 3-phase PWM driven motor, e.g. a brushless DC motor, the PWM periods of each phase are shifted 120° with each other.

Typically, in prior art solutions the motor current is controlled by pulse width modulation of the voltages applied to the motor coil windings. The applied PWM voltages are thereby out of phase with each other for the different motor phases (e.g. 120° for a 3-phase motor. The amplitude of the motor currents determine the motor output speed/torque. These can be controlled by modifying the pulse width. The pulse being within the PWM period.

The top graph of FIG. 1 shows a sinusoidal phase profile multiplied with a scale factor for each of the phases (U, V, W) for a 3-phase BLDC motor in function of the rotor angle. The profiles multiplied with the scaling factors are numbered as follows: for phase U, 111; for phase V, 121; for phase W, 131. Both the horizontal as well as the vertical axis have an arbitrary scale. The phase profiles may be stored in a lookup table or they may be calculated, for example using a sinusoidal function. For a sinusoidal phase profile, the time behavior will also be sinusoidal if the rotor is turning at a constant speed. The pulse width modulated phase voltage scheme can be generated by selecting a value from the phase profile at the position corresponding with the estimated or actual rotor angle and by multiplying this value with the scale factor to obtain the pulse width of the PWM on time. The resulting pulses (112, 122, 132) for each of the phases (U, V, W) are shown in the graphs below the top graph. Each graph representing a different rotor position. In embodiments according to the present invention the duty cycle may be calculated whereby the duty cycle corresponds with the ratio of the pulse width and the PWM period. When the scale factor is 1, the pulse width is equal to the PWM period when the rotor angle corresponds with the maximum of the phase profile.

Figure 2:
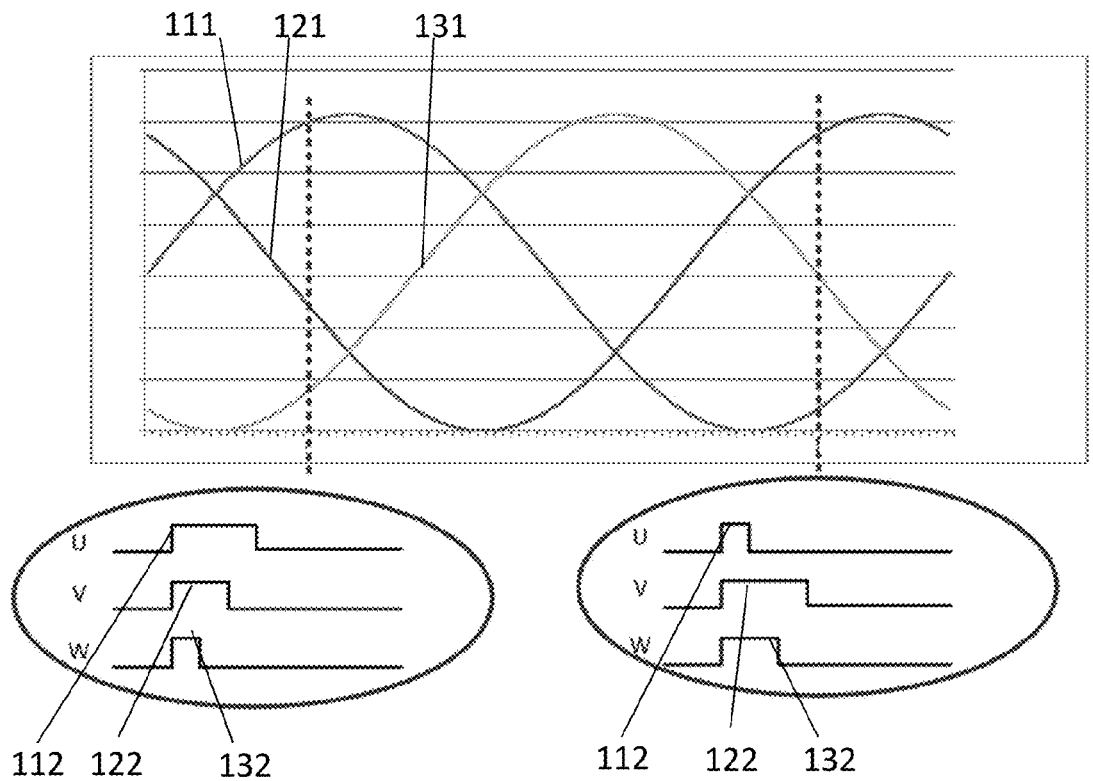
FIG. 2 illustrates a phase profile multiplied with a smaller base scaling factor than in FIG. 1 and the PWM phase voltage scheme for each of the PWM driven moto phases, e.g. the brushless DC motor phases.

FIG. 2 shows an example where a smaller scaling factor is chosen. Because of the arbitrary scale in the top figure this is however not visible in the top graph. In the graphs below the top graph however the time scale is the same in FIG. 1 as in FIG. 2. It can be seen that the pulse width for a pulse in FIG. 2 is smaller than the pulse width for the corresponding pulse in FIG. 1. This is due to the smaller scaling factor with which the phase profile is multiplied to obtain the pulse width.

By decreasing the scaling factor, the pulse width is decreased and hence the rotor speed/torque is also decreased. Since the duration of the PWM switching edges are in reality longer than zero, the motor current, especially of the main torque contributing phase (with longest on time) are being distorted percentage wise more, the shorter the PMW on time actually becomes, leading to distortions of the motor output torque. It can also be seen that with shorter PWM on times also the window for making measurements during the PWM on-time becomes shorter, leading to inaccurate measurements of motor parameters, like e.g. current and/or back electromotive force (BEMF).

In a first aspect the present invention relates to a method 500 for assisting in operating a PWM driven motor, e.g. a brushless DC motor. The method 500 discloses generating 520 a pulse width modulated (PWM) phase voltage scheme 315, during at least a certain period in time. The PWM phase voltage scheme 315 is thereby generated according to a desired phase profile which is multiplied with a base scaling factor. The PWM phase voltage scheme 315 is generated by time multiplexing a first pulse 313 and at least a further pulse 314 within a pulse width modulation period 316 of the phase. The pulse width of the first pulse 313 can be obtained from a first profile, which is in phase with the desired phase profile, by multiplying the first profile at a certain rotor position with a first scaling factor. The pulse width of the further pulse 314 can be obtained from a further profile, which is not in phase with the desired phase profile, by multiplying the further profile at the rotor position with a further scaling factor. The first pulse 313 and the at least one further pulse 314 are positioned within the pulse width modulation period 316 of the phase in at least partially non-overlapping way. In some embodiments of the present invention the first pulse 31 is positioned in the beginning of the pulse width modulation period 316 and the at least one further pulse 314 is positioned at the end of the pulse width modulation period 316. In some embodiments, the combination between the multiplication of the first phase profile and the first scaling factor and the multiplication of the second phase profile and the second scaling factor is equal to the multiplication of the desired phase profile with the base scaling factor.

In embodiments according to the present invention the PWM voltage scheme is realized by time multiplexing a first pulse 313 and a second pulse 314. The second pulse thereby has a pulse width corresponding with the value of a second profile at the rotor position multiplied with a second scaling factor. In embodiments according to the present invention the second profile is not in phase with the desired phase profile. The combination between the first scaling factor and the second scaling factor is equal to the base scaling factor.

In embodiments according to the present invention the second profile is 180° shifted with regard to the first profile. In that case the difference between the first scaling factor and the second scaling factor is equal to the base scaling factor.

In embodiments according to the present invention the first profile and the second profile may be determined upfront by decomposing 510 the desired phase profile into a first profile and an at least one further profile. The decomposition might for example be in a first profile and a second profile. For example in a first profile which is aligned with the desired phase profile and in a second profile which is 180° phase shifted with the desired phase profile. In embodiments according to the present invention these profiles may be stored in a lookup table, they may be pre-recorded, they may be determined according to a predetermined algorithm, etc. In embodiments according to the present invention the desired phase profile is decomposed into a first profile 311 and an at least one further profile 312 whereby the first profile is multiplied with a first scaling factor and the further profile is multiplied with the further scaling factor. In embodiments according to the present invention the at least one further profile is not in phase with the desired phase profile.

The desired phase profile may be a sinusoidal profile or may be another profile suitable for driving the PWM driven motor, e.g. the brushless DC motor.

The generation 520 of the PWM voltage scheme 315 may be done for each of the phases of the PWM driven motor, e.g. the brushless DC motor.

In embodiments according to the present invention a predetermined value is defined. Below this predetermined value the scale factor is so small that distortions in the torque are introduced. In embodiments according to the present invention, generating 520 the PWM phase voltage scheme 315 is done based on the first profile and the at least one further profile in a time period during which the base scaling factor is smaller than the predetermined value. Thereby distortions in the rotation of the PWM driven motor, e.g. the brushless DC motor, are avoided at small base scaling factors. In time periods during which the base scaling factor is larger than the predetermined value, generating 550 the PWM phase voltage scheme is, in some embodiments according to the present invention, done based on the desired phase profile and the base scaling factor. A PWM voltage scheme 315 is generated 550, for at least one phase of the PWM driven motor, e.g. brushless DC motor, whereby the pulse width is obtained by multiplying the value of the desired phase profile at a certain rotor position with the base scaling factor.

In embodiments according to the present invention the obtained PWM phase voltage scheme 315 is applied 530 to the at least one phase of the PWM driven motor, e.g. the brushless DC motor.

In embodiments according to the present invention the rotor position is obtained by measuring motor parameters while the motor is running. Such motor parameters may be the current going through the coils and the back EMF voltage. At least one motor parameter is thereby measured in the undriven phase. Therefore, in embodiments according to the present invention, the PWM voltage scheme is generated and performed such that at least one of the motor phases is undriven.

Figure 3:
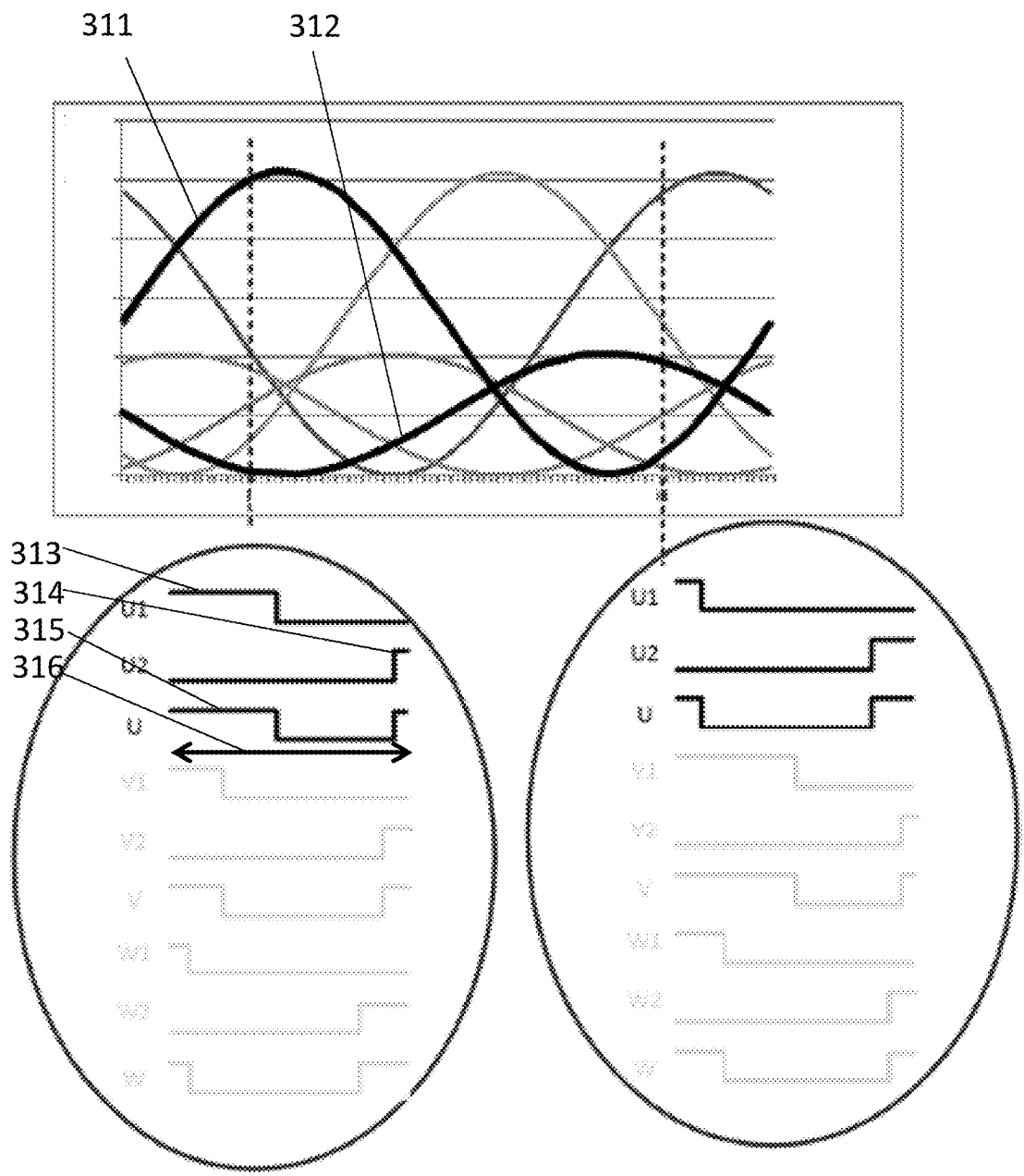
FIG. 3 illustrates a first profile multiplied with a first scaling factor and a second profile multiplied with a second scaling factor, together with the corresponding PWM phase voltage scheme, and this for each phase but highlighted for phase U, in accordance with an embodiment of the present invention.

In the exemplary embodiment illustrated in FIG. 3, the top chart shows a first profile 311 (the first profile in the chart is multiplied with a first scaling factor) and a second profile 312 (the second profile in the chart is multiplied with a second scaling factor). The first profile is in phase with the desired phase profile (not shown in FIG. 3). The second profile 312 is 180° phase shifted with regard to the first profile. In the chart the first profile is multiplied with a first scaling factor, and the second profile is multiplied with a second scaling factor. Thereby the base scaling factor may be equal to the difference between the first scaling factor and the second scaling factor. The first scaling factor and the second scaling factor are both larger than the base scaling factor. The first scaling factor is larger than the second scaling factor.

The pulse width modulated phase voltage scheme 315 is generated, for a given/measured rotor position, by time multiplexing a first pulse 313 and a second pulse 314 within a pulse width modulation period 316. The first pulse 313 has a pulse width according to the value of the first profile 311, at the rotor position, multiplied with the first scaling factor and the second pulse 314 has a pulse width according to the value of the second profile 312, at the rotor position, multiplied with the second scaling factor. In the exemplary embodiment of the present invention illustrated in FIG. 3, the first pulse 313 is positioned at the beginning of the pulse width modulation period 316 and the second pulse 314 is positioned at the end of the pulse width modulation period 316, thereby generating 520, for the given/measured rotor position, a pulse width modulated phase voltage scheme 315. This is illustrated in FIG. 3 for two rotor positions. It is thereby an advantage that the resulting PWM on time can be increased as needed, leading to less distortion and more accurate current and/or BEMF voltage measurements.

Figure 4:
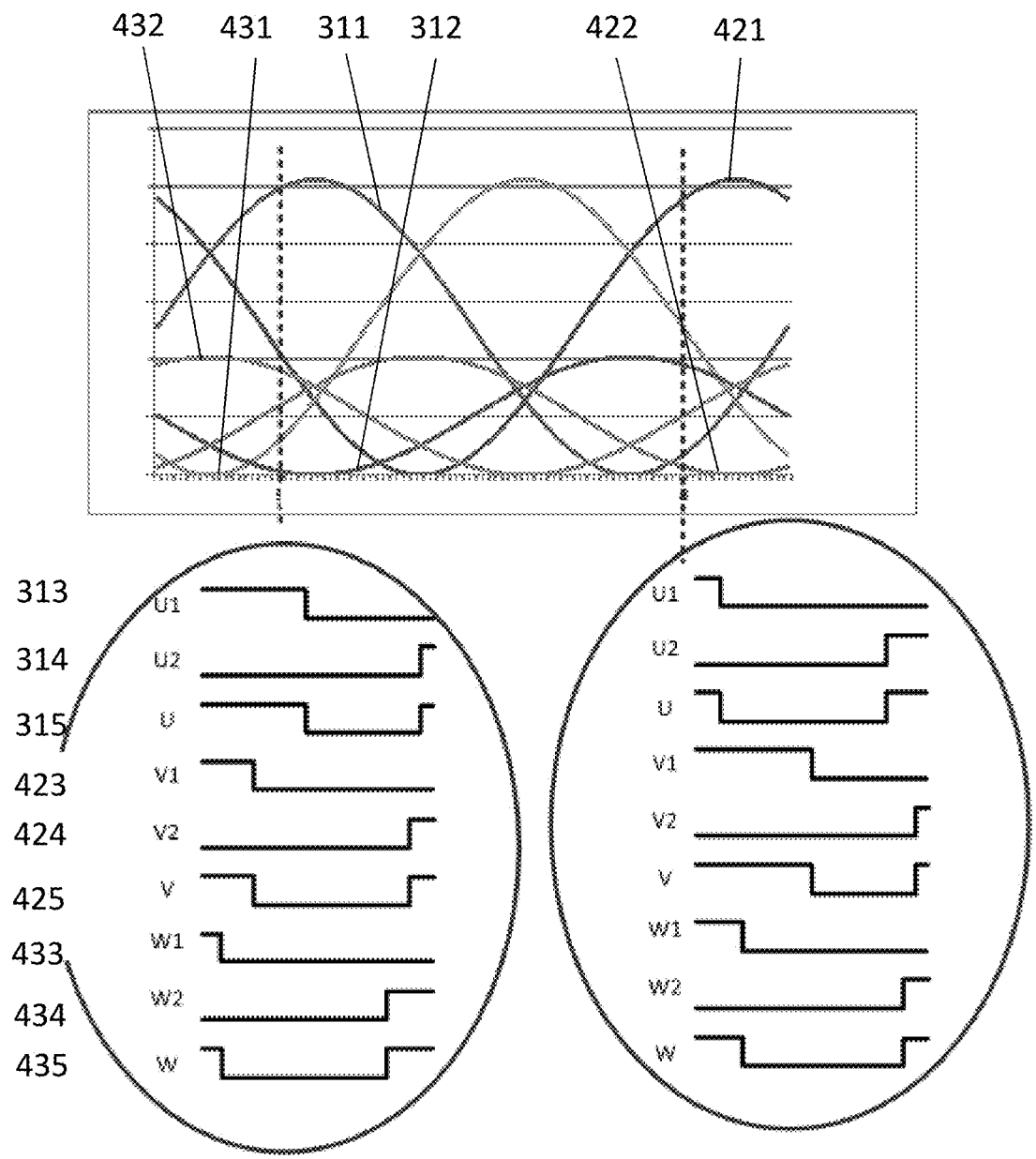
FIG. 4 illustrates a first profile multiplied with a first scaling factor and a second profile multiplied with a second scaling factor, together with the corresponding PWM phase voltage scheme, and this for each phase, in accordance with an embodiment of the present invention.
Figure 5:
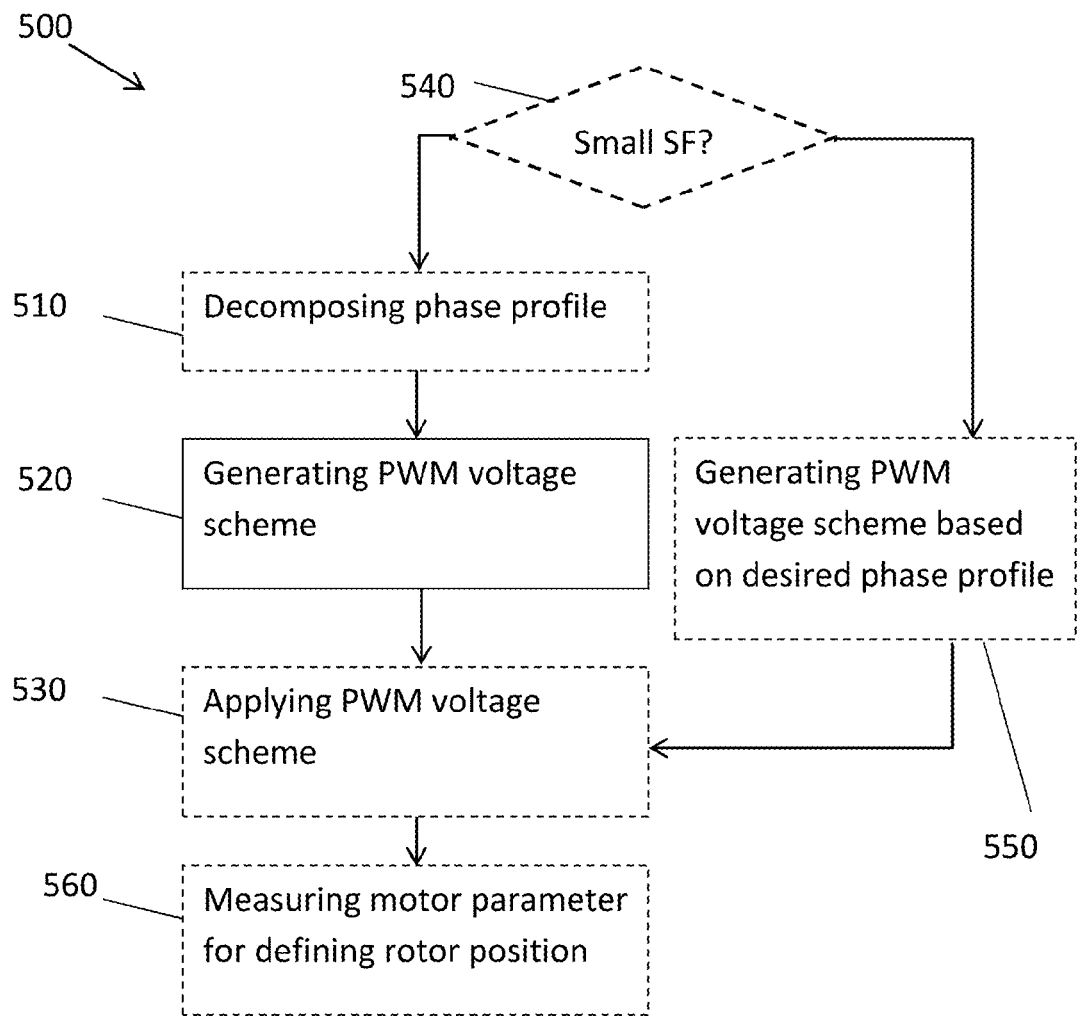
FIG. 5 illustrate method steps for assisting in operating a PWM driven motor, e.g. a brushless DC motor, in accordance with an embodiment of the present invention.

In the exemplary embodiment of the present invention illustrated in FIG. 4, the PWM phase voltage scheme is generated for each motor phase (U, V, W). The top chart shows the first profile multiplied with the first scaling factor and the second profile multiplied with the second scaling factor for each phase (311 and 312 for phase U; 421, 422 for phase V; 431, 432 for phase W). Based thereon the pulse widths are obtained given a certain rotor position, and this for the first pulse as well as for the second pulse. In FIG. 4 the following reference numbering is applied:

For phase U: first pulse 313, second pulse 314, PWM phase voltage scheme 315;
For phase V: first pulse 423, second pulse 424, PWM phase voltage scheme 425;
For phase W: first pulse 433, second pulse 434, PWM phase voltage scheme 435;

In the example illustrated in FIG. 4 the generating step 520 is only applied if the base scaling factor is below the predetermined threshold.

Figure 6:
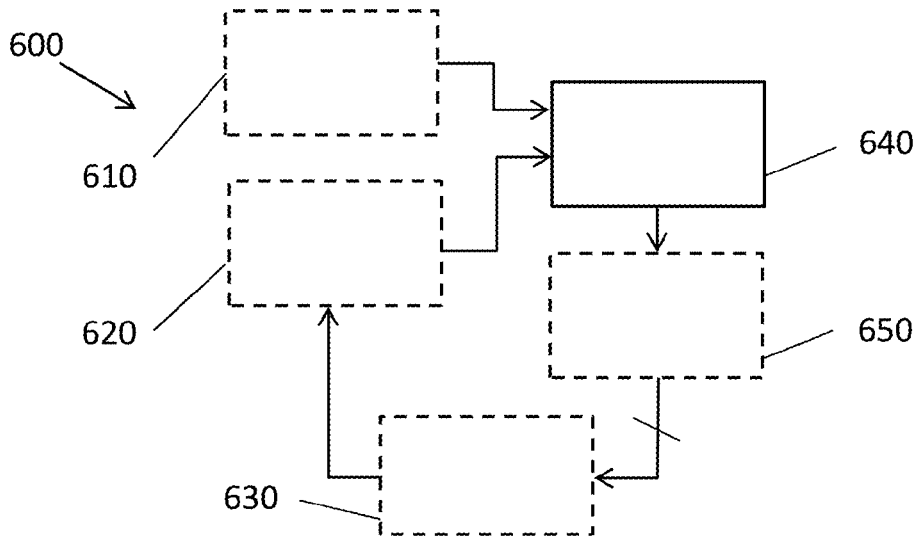
FIG. 6 illustrates the building blocks of a device for assisting in driving a PWM driven motor, e.g. a brushless DC motor, in accordance with an embodiment of the present invention.

In a second aspect, embodiments of the present invention relate to a device 600 for assisting in driving a PWM driven motor, e.g. a brushless DC motor. The device 600 comprises a PWM voltage scheme generator 640 for generating a PWM voltage scheme using a method in accordance with embodiments of the present invention. A schematic overview of the different components which may be comprised in the device 600 is shown in FIG. 6.

The device 600 may also comprise a voltage generation unit 650 which can apply voltage pulses to a phase of a PWM driven motor, e.g. a brushless DC motor based on a PWM phase voltage scheme 315. In embodiments according to the present invention the voltage generation unit 650 may be connectable to a plurality of phases of a PWM driven motor, e.g. brushless DC motor.

In some embodiments, the device 600 may also comprise a measurement unit 620 for measuring at least one motor parameter (e.g. current through a coil, BEMF voltage) in an undriven phase. The measurement unit may be based on any suitable measurement technique, the invention not being limited thereby. The at least one motor parameter is thereby used to obtain the rotor position. This rotor position is used by the PWM voltage scheme generator 640, to obtain the PWM phase voltage scheme 315.

The device 600 may also comprise or be a PWM driven motor, e.g. a brushless DC motor 630 of which the voltage at the phases may be controlled by a voltage generation unit 650 and of which the at least one motor parameter can be measured using a measurement unit 620.

The device 600 may also comprise a processor 610 for determining the first profile and the at least one further profile by decomposing 510 the desired phase profile into a first profile 311 and an at least one further profile 312, using a method in accordance with embodiments of the present invention. The first profile 311 and the at least one further profile 312 are used by the PWM voltage scheme generator 640, to obtain the PWM phase voltage scheme 315.

In still another aspect, the above described system or method embodiments may correspond with an implementation of the method as a computer implemented invention in a processor. Such a processor includes at least one programmable computing component coupled to a memory subsystem that includes at least one form of memory, e.g., RAM, ROM, and so forth. It is to be noted that the computing component or computing components may be a general purpose, or a special purpose computing component, and may be for inclusion in a device, e.g., a chip that has other components that perform other functions. Thus, one or more aspects of the present invention can be implemented in digital electronic circuitry, or in computer hardware, firmware, software, or in combinations of them. While a processor as such is prior art, a system that includes the instructions to implement aspects of the methods for determining a pulse width modulation voltage phase scheme or for driving a PWM driven motor, e.g. a brushless DC motor is not prior art. The present invention thus also includes a computer program product which provides the functionality of any of the methods for determining a pulse width modulation voltage phase scheme according to the present invention when executed on a computing device. In another aspect, the present invention relates to a data carrier for carrying a computer program product. Such a data carrier may comprise a computer program product tangibly embodied thereon and may carry machine-readable code for execution by a programmable processor. The present invention thus relates to a carrier medium carrying a computer program product that, when executed on computing means, provides instructions for executing any of the methods for determining a pulse width modulation voltage phase scheme or for driving a PWM driven motor, e.g. a brushless DC motor as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The invention claimed is:

1. A method for assisting in operating a PWM driven motor, the method comprising, during at least a certain period in time, the following steps for at least one phase of the brushless DC motor:
   generating, for a given/measured rotor position, a pulse width modulated phase voltage scheme according to a desired phase profile with a base scaling factor,
   by time multiplexing a first pulse and at least one further pulse within a pulse width modulation period of the phase,
   the first pulse having a pulse width according to a first phase profile, for that rotor position, multiplied with a first scaling factor, the first phase profile being in phase with the desired phase profile, and
   the at least one further pulse having a pulse width that corresponds with at least one further phase profile, for that rotor position, multiplied with a further scaling factor, the at least one further phase profile being not in phase with the desired phase profile,
   whereby the first pulse and the at least one further pulse are positioned within the pulse width modulation period of the phase in at least partially non-overlapping way, and whereby a combination between the multiplication of the first phase profile and the first scaling factor and the multiplication of the at least one further phase profile and the further scaling factor corresponds with the multiplication of the desired phase profile with the base scaling factor,
   wherein said method furthermore comprises, prior to said generating, determining the first phase profile and the at least one further phase profile by decomposing the desired phase profile comprising the base scaling factor, into the first phase profile which is multiplied with the first scaling factor and the at least one further phase profile which is multiplied with the further scaling factor, whereby the first profile is in phase with the desired phase profile, and whereby the at least one further profile is not in phase with the desired phase profile,
   wherein the method further comprises applying a voltage by a voltage generation unit according to the pulse width modulated phase voltage scheme.

2. A method according to claim 1, wherein said at least one further pulse is a second pulse, the second pulse having a pulse width corresponding with a second profile, for that rotor position, multiplied with a second scaling factor, the second profile being not in phase with the desired phase profile, and whereby a combination between the multiplication of the first phase profile and the first scaling factor and the second phase profile and the second scaling factor corresponds with a multiplication of the desired phase profile and the base scaling factor.

3. A method according to claim 2, wherein the second profile is 180° shifted with the desired phase profile and whereby said combination is a difference.

4. A method according to claim 1, whereby the first pulse is positioned in the beginning of the pulse width modulation period and whereby the at least one further pulse is positioned at the end of the pulse width modulation period.

5. A method according to claim 1 whereby the desired phase profile is a sinusoidal phase profile.

6. A method according to claim 1, wherein the method comprises performing said generating for each of the phases of the PWM driven motor.

7. A method according to claim 1, wherein said method comprises applying said generated pulses to the at least one phase of the PWM driven motor.

8. A method according to claim 1, wherein said generating the pulse width modulated voltage scheme is performed while in one of the phases the motor phase voltage is temporarily suspended and in the other phases the motor phase voltage is on, and
wherein the method further comprises measuring at least one motor parameter in the undriven phase for defining the rotor position.

9. A method according to claim 1, wherein the combination corresponds with time multiplexing and/or wherein the combination corresponds with a linear combination and/or wherein the first scaling factor and the at least one further scaling factor is larger than the base scaling factor.

10. A computer program product comprising a set of instructions for, when executed on a computer, performing a method for assisting in driving a PWM driven motor according to claim 1.

11. A method comprising transmitting the instructions for the computer program product according to claim 10, over a local or wide area network.

12. A data carrier comprising a set of instructions for, when executed on a computer, performing a method for assisting in driving a PWM driven motor according to claim 1.

13. A method according to claim 1,
wherein said generating is performed during said at least a certain period in time wherein the base scaling factor is smaller than a predetermined value, and
wherein outside said certain period in time when the base scaling factor is larger than a predetermined value, the method comprises
for at least one phase of the PWM driven motor generating, for a given/measured rotor position, a pulse width modulated phase voltage scheme with a pulse width equal to the current value of the desired phase profile, for that rotor position, multiplied with the base scaling factor.

14. A method for assisting in operating a PWM driven motor, the method comprising, during at least a certain period in time, the following steps for at least one phase of the brushless DC motor:
generating, for a given/measured rotor position, a pulse width modulated phase voltage scheme according to a desired phase profile with a base scaling factor,
by time multiplexing a first pulse and at least one further pulse within a pulse width modulation period of the phase,
the first pulse having a pulse width according to a first phase profile, for that rotor position, multiplied with a first scaling factor, the first phase profile being in phase with the desired phase profile, and
the at least one further pulse having a pulse width that corresponds with at least one further phase profile, for that rotor position, multiplied with a further scaling factor, the at least one further phase profile being not in phase with the desired phase profile,
whereby the first pulse and the at least one further pulse are positioned within the pulse width modulation period of the phase in at least partially non-overlapping way, and whereby a combination between the multiplication of the first phase profile and the first scaling factor and the multiplication of the at least one further phase profile and the further scaling factor corresponds with the multiplication of the desired phase profile with the base scaling factor,
wherein said generating is performed during said at least a certain period in time wherein the base scaling factor is smaller than a predetermined value, and
wherein outside said certain period in time when the base scaling factor is larger than a predetermined value, the method comprises
for at least one phase of the PWM driven motor generating, for a given/measured rotor position, a pulse width modulated phase voltage scheme with a pulse width equal to the current value of the desired phase profile, for that rotor position, multiplied with the base scaling factor,
wherein the method further comprises applying a voltage by a voltage generation unit according to the pulse width modulated phase voltage scheme.

15. A device for assisting in driving a PWM driven motor, the device comprising
a pulse width modulated phase voltage scheme generator configured for generating, for a given/measured rotor position, a pulse width modulated phase voltage scheme according to a desired phase profile with a base scaling factor,
by time multiplexing a first pulse and at least one further pulse within a pulse width modulation period of the phase,
the first pulse having a pulse width according to a first phase profile, for that rotor position, multiplied with a first scaling factor, the first phase profile being in phase with the desired phase profile, and
the at least one further pulse having a pulse width that corresponds with at least one further phase profile, for that rotor position, multiplied with a further scaling factor, the at least one further phase profile being not in phase with the desired phase profile,
whereby the first pulse and the at least one further pulse are positioned within the pulse width modulation period of the phase in at least partially non-overlapping way, and wherein a combination between the multiplication of the first phase profile and the first scaling factor and the multiplication of the at least one further phase profile and the further scaling factor corresponds with the multiplication of the desired phase profile with the base scaling factor,
the generator is configured for, prior to said generating, determining the first profile and the at least one further profile by decomposing the desired phase profile comprising the base scaling factor, into the first profile which is multiplied with the first scaling factor and the at least one further profile which is multiplied with the further scaling factor, whereby the first profile is in phase with the desired phase profile, and whereby the at least one further profile is not in phase with the desired phase profile, wherein the device furthermore comprises a voltage generation unit configured for applying voltages according to the pulse width modulated phase voltage scheme.

16. A device according to claim 15, wherein said at least one further pulse is a second pulse, the second pulse having a pulse width corresponding with a second profile, for that rotor position, multiplied with a second scaling factor, the second profile being not in phase with the desired phase profile and whereby the combination between the multiplication of the first phase profile and the first scaling factor and the multiplication of the second phase profile and the second scaling factor corresponds with the desired phase profile and the base scaling factor.

17. A device according to claim 16, wherein the second profile is 180° shifted with the desired phase profile and whereby said combination is a difference.

18. A device according to claim 15, wherein the device furthermore comprises a measurement unit for measuring at least one motor parameter in an undriven phase for defining a rotor position.

19. A PWM driven motor comprising a device for assisting in driving according to claim 15.

* * * * *